Nov. 20, 1951 M. MAINCON 2,575,722
PROCESS FOR PRODUCTION OF LOWER ALIPHATIC ESTERS
Filed Nov. 1, 1948
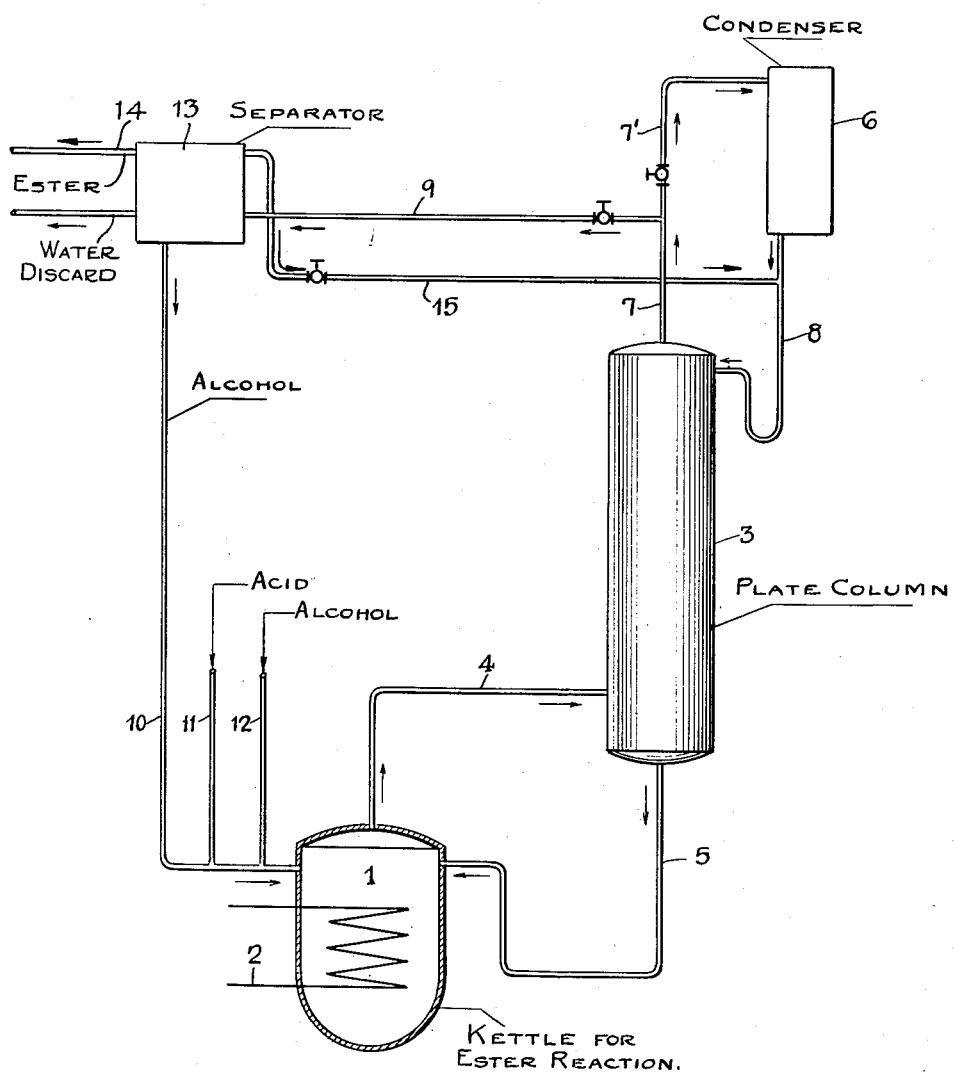
INVENTOR.
MAURICE MAINCON.
BY
ATTORNEYS.

Patented Nov. 20, 1951

2,575,722

UNITED STATES PATENT OFFICE 2,575,722

PROCESS FOR PRODUCTION OF LOWER ALIPHATIC ESTERS

Maurice Mainçon, Vendin le Vieil, France, assignor to Les Usines de Melle (Societe Anonyme), Saint-Leger-les-Melle, France, a corporation of France Application November 1, 1948, Serial No. 57,744
In France November 3, 1947

10 Claims. (Cl. 260—488)

This invention relates to a process of manufacture of lower aliphatic esters and particularly to a continuous process for producing saturated and unsaturated lower aliphatic esters.

Several processes for continuous manufacture of esters are based on the following principle: into a bath composed of acid, alcohol, catalyst (generally sulfuric acid), and products of the reaction (esters and water) is fed continuously an equimolecular mixture of acid and alcohol. The bath so fed is heated in such a manner that, in a given time, the ester and the water, corresponding to the input during that time, are eliminated from the bath in the form of vapors.

The vapors emitted by the esterification bath contain in all cases the four volatile constituents of the bath (alcohol, acid, ester and water), the composition of the vapors depending upon the relative volatilities of the constituents and upon the quantitative composition of the bath.

In all cases also, in order to keep the composition of the bath constant, which is a condition of the continuity of the above-described operation, one treats the emitted vapors to separate their constituents; the acid and the alcohol which they contain are sent back into the bath, as well as a portion of that one of the products of the reaction (water or ester) which has been found to be extracted in the vapors in a quantity greater than the quantity produced. Consequently, in a given time, one draws from the aggregate of the equipment a number of molecules of water and of ester that is exactly equal to that of the molecules of acid and alcohol introduced during the same time.

In the special case of the lower aliphatic esters, such as methyl, ethyl, propyl, isopropyl, and allyl formate, methyl, ethyl, and ispropyl acetate, and methyl propionate, the vapor tension of the esters and of the alcohols is much greater than that of the water; on the other hand the quantity of water that is produced is relatively greater than with the higher esters (18 grams to 60 grams in the case of methyl formate; 18 grams to 88 grams in the case of ethyl acetate).

It follows therefrom that with the esterification baths generally used prior to my invention, and which are rich in alcohol or in acid, but poor in water, the ratio between the water and the ester contained in the vapors emitted by the bath is much lower than the ratio in which they are formed, and in order to arrive at removing in the form of vapor all the water that is formed, one must distill a large volume of vapors containing a total quantity of ester that is far greater than that which corresponds to the feeding with acid and alcohol, and often a quantity of alcohol that is likewise considerable. These products, uselessly removed from the bath, are returned to it, a procedure which represents, economically speaking, a useless expenditure of calories.

The principal object of the present invention, accordingly, is to produce an efficient and economical process for the production of such esters and to overcome at least some of the disadvantages of the prior processes.

The invention accordingly comprises the novel process and steps of processes, specific embodiments of which are described hereinafter by way of example and in accordance with which I now prefer to practice the invention.

I have found in accordance with my invention that lower aliphatic esters having 2 to 5 carbon atoms can be prepared from the corresponding lower aliphatic acid and lower aliphatic alcohol by a process which includes continuously feeding the alcohol and acid into a catalytic bath in proportion to produce the ester, the bath containing an esterification catalyst, water in the proportion of at least 50% by weight, and the acid and alcohol mentioned. The proportion of alcohol in the bath should be lower than the proportion of acid. The bath is heated to cause esterification and ester, alcohol, water and acid are continuously distilled from the bath, the heating being regulated so that the formed ester and water added are substantially entirely vaporized in proportion to their presence in the bath. I then continuously wash the distillate with a liquid in order to remove acid therefrom substantially without removing the ester. The acid so removed is then returned to the bath. The washing may be effected by washing the distillate with a small quantity of reflux insufficient to form an azeotropic mixture of ester and water.

The catalytic bath that is initially established comprises essentially water, acid, and alcohol that are to be combined and an esterification catalyst, for example sulfuric acid. It is advantageous to make the alcohol figure in it in a proportion lower than that of the acid and, in fact, as small as is possible without unfavorably affecting the speed of reaction between the acid and the alcohol. The most advantageous concentrations, in practice, are those of about 5 to 20% of alcohol in the bath, concentrations lower than 10% being generally preferable.

For practising the invention, one proceeds preferably in the following manner: one heats the catalytic bath while at the same time feeding it continuously with acid and alcohol in the relative proportions calculated for the production of the ester that is desired; one regulates the heating so that the ester is vaporized practically in its entirety in proportion to its formation and so that in this way its proportion in the bath remains very low; and finally one effects continuously an introduction of acid and alcohol into the bath in order to offset the losses by evaporation and to maintain the constancy or quasi-constancy of the proportion of these constituents in the bath and of the volume of the latter. As a general rule, the process is operated so that the concentration of the ester in the bath does not appreciably exceed 5%. Any water added is also substantially entirely vaporized by such regulated heating in proportion to its presence in the bath.

To compensate losses by evaporation it is evidently advantageous to recover, from the vapors produced, the total or a portion of one or more of the constituents other than the ester and the water; nevertheless all or a portion of the water may be introduced into the bath as a substance accompanying the alcohol and/or acid supplied, which are thus introduced in the form of aqueous solutions.

This recovery of evaporated constituents may be effected in any separation apparatus or installation of well-known type, and, in many cases, it may be limited to the alcohol in consideration of the fact that the acid is, after the water, the least volatile constituent of the bath and that, in consequence, the losses of acid by evaporation are relatively not very considerable.

Where it is desired to recover the evaporated acid, one subjects the vapors originating from the bath to a washing by means of liquid produced by the condensation of previously distilled vapors, in a proportion sufficiently great to constitute a barrier with respect to the vapors of acid, but insufficiently great to permit the formation of the azeotropic mixture of water and ester which would be too rich in ester.

It is thus convenient to effect this washing by bubbling the vapors through liquid on the plates of a column which column is surmounted by a vapor condenser, but the method is not limited to such operation.

As a variant form, one may use as washing liquid, for example in a plate column or a sprinkling or trickling tower, etc., pure ester originating, for example, from the apparatus or installation for treatment of the vapors, or even water.

In all cases it is expedient not to promote the formation of the binary mixture of ester and water and not to fall into the faults of the usual processes which, by an excess of refining, bring about excessive expenditures of calories and a diminution of the capacity of the baths. In accordance with the invention, the proportion of washing liquid is preferably comprised between 0.2 and 0.5 times the weight of the vapors escaping from the bath.

One ascertains that the high hourly production of ester, coupled with the considerable reduction of the expenditure of calories and with the diminution of the size of apparatus for treatment of the vapors (which results by reducing the volume of vapors escaping from the bath) produces an efficient economical process which is an object of the invention.

In the examples which follow one may secure an expression in figures of the relative yields of all the fluids.

The accompanying drawing forming part of this application shows one form of apparatus in which the process of the invention may be carried out.

The single figure is a diagram of apparatus suitable for carrying out the process.

An esterification boiler or kettle 1 comprises a heating device 2, such as an immersed coil, and a pipe for egress of vapors 4, terminating at the lower part of a plate column 3. From the foot of the latter there issues a pipe 5 for return of liquid, terminating at the kettle 1.

Above the column 3 there is mounted a condenser 6 supplied with vapors coming from the column 3 by way of a pipe 7' which has a regulating cock and which is connected to the pipe for egress of vapors 7; at 8 there is indicated a pipe for return passage of condensed liquid.

To the pipe 7 there is likewise connected a pipe 9, equipped with a cock and terminating at a separation apparatus 13, of any type (for example, a distillation installation preceded by a decanter), in which the alcohol, ester and water are separated from each other.

A pipe 10 passing from the apparatus 13 to the boiler 1 makes it possible to return to it the alcohol that is recovered. At 11 and 12 there are indicated the feed pipes for input of acid and of alcohol.

The following are given as examples. The invention is not to be considered as limited thereto except as indicated in the appended claims.

*Example 1.—Manufacture of methyl acetate*

The kettle 1, of a capacity of 2500 liters, is charged with an initial filling comprising:

| | |
|---|---|
| Water | 800 kgs., or 53% |
| Acetic acid | 430 kgs., or 29% |
| Methyl alcohol | 255 kgs., or 17% |
| Sulfuric acid | 15 kgs., or 1% |

Through the pipes 11 and 12 one introduces, respectively, 400 kilograms of glacial acetic acid and 215 kilograms of pure methyl alcohol per hour.

One heats, by means of the coil 2, in such fashion that a total weight of 965 kilograms of vapors escape from the bath per hour; these vapors have the following composition:

| | Per cent |
|---|---|
| Methyl acetate | 61 |
| Water | 24 |
| Methyl alcohol | 11 |
| Acetic acid | 4 |

The proportion of methyl acetate in the bath is maintained at about 15 kilograms or about 1% of the weight of the bath. Into the condenser 6 one directs 250 kilograms of vapors per hour, which are condensed therein, and the corresponding liquid is conducted back by way of the pipe 8 to column 3. In this way, the vapors escaping through the pipe 9 have the following composition:

| | Per cent |
|---|---|
| Methyl acetate | 69 |
| Water | 17 |
| Methyl alcohol | 14 |
| Acetic acid | 0.1 |

The separator 13 separates the constituents of the vapors, the ester passing out through pipe 14 and the alcohol passing into pipe 10. The separated water is discarded.

By way of the pipe 10 one returns into the bath 100 kilograms of recovered methyl alcohol per hour.

By the above amount of feed through pipes 10, 11 and 12, the volume and the composition of the bath are kept constant and in perfect equilibrium indefinitely, the production of ester being 500 kilograms per hour, through pipe 14.

*Example 2.—Manufacture of ethyl formate*

The bath introduced into the kettle is as follows:

Water _____ 1050 kgs., or 70%
Formic acid_____ 330 kgs., or 22%
Ethyl alcohol_____ 105 kgs., or 7%
Sulfuric acid_____ 15 kgs., or 1%

One introduces into this bath, per hour, 470 kilograms of 80% technical formic acid and 390 kilograms of alcohol of 96.5% (by volumes), corresponding to 374 kilograms of pure formic acid and 374 kilograms of pure ethyl alcohol.

One distills 1310 kilograms of vapors per hour, the vapors evolving from the bath having the following composition:

| | Per cent |
|---|---|
| Ethyl formate | 53 |
| Water | 30.5 |
| Ethyl alcohol | 12 |
| Formic acid | 4.5 |

Having isolated the condenser 6 by the closing of the cock of the pipe 7', one returns 300 kilograms per hour of anhydrous ethyl formate at the top of the column 3, for example by way of a pipe 15 going from the apparatus 13 to the pipe 8. The proportion of ethyl formate in the bath is maintained at about 15 kilograms.

In the vapors escaping through the pipe 9 and which have the following composition:

| | Per cent |
|---|---|
| Ethyl formate | 59 |
| Ethyl alcohol | 15 |
| Water | 26 | there are 150 kilograms of alcohol per hour, which, after separation from the other elements composing these vapors, separation being effected at 13 as heretofore indicated, are returned to the kettle by way of the pipe 10. In this way one produces 600 kilograms of pure ethyl formate per hour, the composition of the bath remaining constant.

*Example 3.—Manufacture of ethyl acetate*

The bath introduced into the kettle is as follows:

Water _____ 870 kgs., or 58%
Acetic acid_____ 540 kgs., or 36%
Ethyl alcohol_____ 68 kgs., or 4.5%
Sulfuric acid_____ 22 kgs., or 1.5%

One introduces into this bath 288 kilograms of 99% acetic acid through pipe 11 and 225 kilograms of ethyl alcohol of 96.5% (by volume) through pipe 12 per hour.

One distills 1300 kilograms of vapors per hour into column 3, which vapors have the following composition:

| | Per cent |
|---|---|
| Ethyl acetate | 44 |
| Water | 30 |
| Acetic acid | 10 |
| Ethyl alcohol | 16 |

By regulation of the valve in pipe 7', 650 kilograms per hour of vapors passing from the top of column 3 pass into the condenser 6 and then the condensed liquid is returned through pipe 8 into the column 3. The vapors passing through the pipe 9 have the following composition:

| | Per cent |
|---|---|
| Ethyl acetate | 61 |
| Water | 18 |
| Acetic acid | 0.8 |
| Ethyl alcohol | 20.2 |

So, 146 kilograms of ethyl alcohol 96.5% (by volume) pass through the pipe 9 per hour and, after separation at 13 as heretofore, are returned to the kettle by way of pipe 10. Under these conditions, 420 kilograms of pure ethyl acetate are produced per hour. The proportion of ethyl acetate in the bath is maintained at about 44 kilograms.

*Example 4.—Manufacture of isopropyl acetate*

One operates with a bath having the following equilibrium composition:

Water _____ 750 kgs., or 50%
Acetic acid_____ 525 kgs., or 35%
Isopropyl alcohol_____ 165 kgs., or 11%
Isopropyl acetate_____ 45 kgs., or 3%
Sulfuric acid_____ 15 kgs., or 1%

One introduces into this bath, per hour, while heating, 210 kilograms of pure acetic acid through pipe 11 and, through pipe 12, 180 kilograms of aqueous isopropyl alcohol containing 88% (by weight) isopropyl alcohol, which composition corresponds to the binary azeotropic mixture of water and isopropyl alcohol.

One distills 1175 kilograms of vapors per hour, the vapors evolving from the bath having the following composition:

| | Per cent |
|---|---|
| Isopropyl acetate | 45 |
| Water | 35 |
| Acetic acid | 12 |
| Isopropyl alcohol | 8 |

The vapors in pipe 7, which have the following composition:

| | Per cent |
|---|---|
| Isopropyl acetate | 59.5 |
| Water | 17 |
| Isopropyl alcohol | 22.5 |
| Acetic acid | 1 | are divided into two equal parts, one of which is directed into the condenser 6 through pipe 7', and the other is passed into the pipe 9. In the separating device 13, there are separated per hour 350 kgs. of pure isopropyl acetate, 83 kgs. of water and 4 kgs. of acetic acid, with water and acid are discarded, and 150 kgs. of aqueous isopropyl alcohol containing 88% isopropyl alcohol and which return to the kettle 1 via pipe 10.

*Example 5.—Manufacture of allyl formate*

One operates with a bath having the following equilibrium composition:

Water _____ 930 kgs., or 62%
Formic acid_____ 360 kgs., or 24%
Allyl alcohol_____ 150 kgs., or 10%
Allyl formate_____ 30 kgs., or 2%
Benzene-sulfonic acid_____ 30 kgs., or 2%

One heats the bath and one introduces into it, per hour, 340 kilograms of allyl alcohol and 270 kilograms of formic acid. The vapors which evolve from the bath have the following composition:

| | Per cent |
|---|---|
| Water | 38 |
| Allyl formate | 51 |
| Formic acid | 5 |
| Allyl alcohol | 6 |

One distills per hour 1004 kilograms of vapors, of which 300 kilograms are directed into the condenser 6 through pipe 7', and the remaining 704 kilograms are directed into the pipe 9. The vapours passing through said pipe 9 have the following composition:

| | Per cent |
|---|---|
| Allyl formate | 71 |
| Water | 15 |
| Allyl alcohol | 14 |

In the separating device 13, there are separated per hour 500 kgs., of pure allyl formate, 104 kgs. of water which are discarded and 100 kgs. of allyl alcohol which are returned to the kettle 1 via pipe 10.

In all of the examples except Example 2 above the valve in the pipe 15 is closed during the carrying out of the process.

Neither the foregoing examples nor the diagram of equipment are intended to be of a limiting character. Thus, for example, the column 3 and the boiler 1 may be grouped one above the other in a single piece of apparatus.

What I claim is:

1. A process for making lower aliphatic esters having 2 to 5 carbon atoms from the corresponding lower aliphatic acid and lower aliphatic alcohol, which comprises, continuously feeding said alcohol and acid into a catalytic bath in proportion to produce ester, said bath containing an esterification catalyst, and water in the proportion of at least 50% by weight of the bath, and such acid and alcohol, the proportion of alcohol in the bath being lower than the proportion of acid, heating said bath to cause esterification, continuously distilling ester, alcohol, water and acid from the bath, the heating being regulated so that the formed ester and water added are substantially entirely vaporized in proportion to their presence in the bath, continuously washing the distillate with a liquid substantially without removing ester from the distillate, and regulating said feed of alcohol and acid into the bath to compensate for evaporation losses and to maintain substantially constant the composition and volume of the bath.

2. A process for making lower aliphatic esters having 2 to 5 carbon atoms from the corresponding lower aliphatic acid and lower aliphatic alcohol, which comprises, continuously feeding said alcohol and acid into a catalytic bath in proportion to produce ester, said bath containing an esterification catalyst, water in the proportion of at least 50% by weight, and such acid and alcohol, the proportion of alcohol in the bath being lower than the proportion of acid, heating said bath to cause esterification, continuously distilling ester, alcohol, water and acid from the bath, the heating being regulated so that the formed ester and water added are substantially entirely vaporized in proportion to their presence in the bath, and continuously washing the distillate with a small quantity of reflux insufficient to form an azeotropic mixture of ester and water in order to remove acid from the distillate.

3. A process for making lower aliphatic esters having 2 to 5 carbon atoms from the corresponding lower aliphatic acid and lower aliphatic alcohol, which comprises, continuously feeding said alcohol and acid into a catalytic bath in proportion to produce ester, said bath containing an esterification catalyst, water in the proportion of at least 50% by weight, and such acid and alcohol, the proportion of alcohol in the bath being lower than the proportion of acid, heating said bath to cause esterification, continuously distilling ester, alcohol, water and acid from the bath, the heating being regulated so that the formed ester and water added are substantially entirely vaporized in proportion to their presence in the bath, continuously washing the distillate with a liquid in order to remove acid therefrom substantially without removing the ester, and returning the acid so washed out to the bath.

4. A process in accordance with claim 1 in which the content of alcohol in the bath is about 5 to 20% by weight.

5. A process in accordance with claim 1 in which the heating is regulated so that the proportion of ester in the bath is not substantially greater than 5% by weight.

6. A process according to claim 3 in which the liquid employed for washing is a condensate of the distillate used in sufficient amount to remove the acid but insufficient to form an azeotropic mixture of water and ester.

7. A process in accordance with claim 3 in which the proportion of wash liquid is in the range of 0.2 to 0.5 times the weight of the distillate from the bath.

8. A process in accordance with claim 1 in which the acid is acetic acid and the alcohol is methyl alcohol for forming the ester.

9. A process in accordance with claim 1 in which the acid is formic acid and the alcohol is ethyl alcohol for forming the ester.

10. A process in accordance with claim 1 in which the acid is acetic acid and the alcohol is ethyl alcohol for forming the ester.

MAURICE MAINÇON.

REFERENCES CITED

The following references are of record in the file of this patent:

UNITED STATES PATENTS

| Number | Name | Date |
|---|---|---|
| 1,260,977 | Helbronner | Mar. 26, 1918 |
| 1,400,849 | Backhaus | Dec. 20, 1921 |
| 1,770,779 | Horsley | July 15, 1930 |
| 2,095,496 | Gerg | Oct. 12, 1937 |
| 2,147,341 | Harrington | Feb. 14, 1939 |
| 2,208,770 | McKeon | July 25, 1940 |